H. N. MOTSINGER.
GOVERNOR.
APPLICATION FILED OCT. 18, 1909.

963,309.

Patented July 5, 1910.

Witnesses
Walter Troemel.
Thomas W. McMeans

Inventor
Homer N. Motsinger.
By Bradford Hood.
Attorneys.

HOMER N. MOTSINGER, OF PENDLETON, INDIANA, ASSIGNOR TO MOTSINGER DEVICE MFG. CO., OF PENDLETON, INDIANA, A CORPORATION OF INDIANA.

GOVERNOR.

963,309.

Specification of Letters Patent.

Patented July 5, 1910.

Application filed October 18, 1909. Serial No. 523,140.

*To all whom it may concern:*

Be it known that I, HOMER N. MOTSINGER, a citizen of the United States, residing at Pendleton, in the county of Madison and State of Indiana, have invented certain new and useful Improvements in Governors, of which the following is a specification.

The object of my invention is to produce a governor pulley structure which may be cheaply manufactured and by means of which the frictional engagement between another wheel and the governor pulley will be automatically varied in accordance with the speed of the governor pulley.

The accompanying drawings illustrate my invention as applied to a magneto electric generator.

Figure 1:
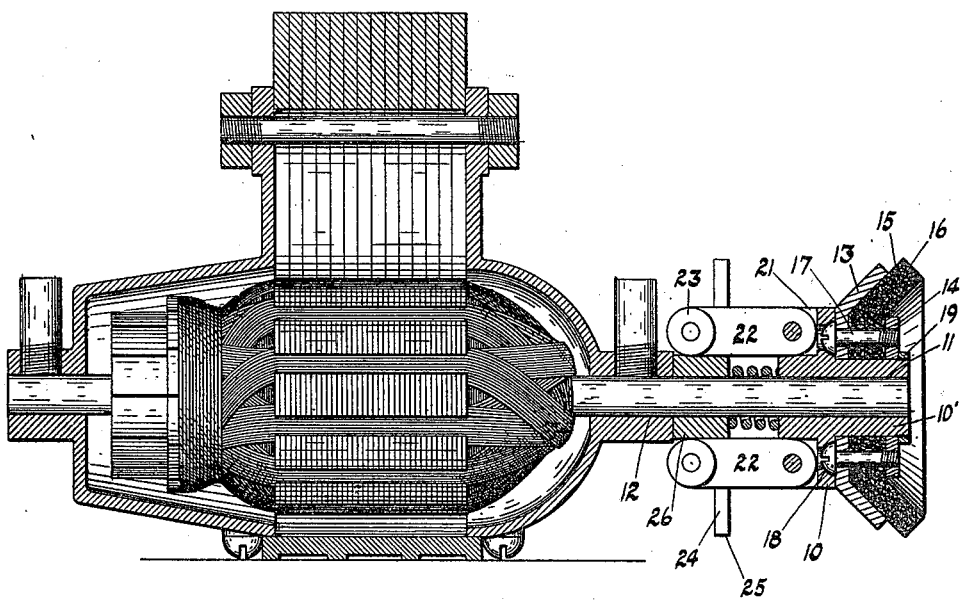
Figure 2:
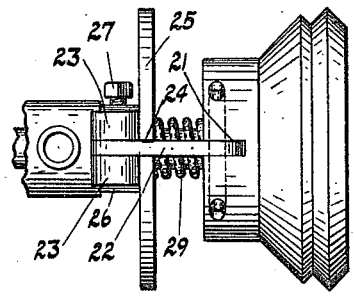

Figure 1 is an axial section of a generator equipped with my improved governor; and Fig. 2 a side elevation of the governor.

In the drawings, 10 indicates a cylindrical main body having a central bore 11 adapted to freely receive a shaft 12. The main body 10 is provided at its outer end with a hub portion 10' adapted to receive a friction member comprising a pair of annular plates 13 and 14 between which is clamped a leather or other suitable friction cup 15 having a working face 16. The two plates 13 and 14 are clamped together upon the cup 15 by means of clamping screws 17 which pass freely through plate 13 and are threaded into plate 14. The friction member slips freely upon hub 10' but the heads of clamping screws 17 enter sockets 18 formed in the main body 10 and the friction member is held in place, with the ends of the clamping screws 17 in the sockets 18 by means of a nut 19 threaded upon the outer end of hub 10' the heads of the clamping screws thus serving as keys to prevent rotation of the friction member upon the main body 10.

Formed in that end of main body 10, opposite hub 10' are two (or more) pockets or notches 21 in each of which is pivoted one end of a link 22 the width of which fits snugly within the pocket 21. At its free end each link 22 is provided with one or two rollers 23, 23 and the intermediate portion of each link lies within a radial notch 24 formed in a disk 25 carried by a hub 26 which is secured to shaft 12, so as to rotate therewith, by any suitable means, as for instance, a set screw 27.

Surrounding shaft 12 between hub 26 and main body 10 is a compression spring 29 which urges the main body 10 away from hub 26 and thus normally tends to keep arms 22 in a position approximating parallelism with the axis of shaft 12 and at the inner ends of the radial notches 24.

A rotative force applied to the friction member will tend to rotate it upon shaft 12 but this rotative movement is prevented by arms 22 and is therefore transmitted by said arms to hub 26 and thence to shaft 12. As the speed of shaft 12 increases the weight of rollers 23, causes said rollers to tend to move radially outwardly and thus, acting upon the rear face of disk 25, reduces the effective force of spring 29 on the friction member, and thus reduces the effective force with which said friction member is held in engagement with the driving wheel. If the speed becomes sufficient, there will be an appreciable radially outward movement of the pulley structure upon the shaft and cause a definite withdrawal, momentarily, of the friction member from the driving wheel.

I claim as my invention:

1. A governor pulley comprising a friction member and a hub member, the said hub member being adapted for connection with a shaft to rotate therewith and one of said members having a pair of radial slots, a pair of arms pivoted to the other of said members so as to swing toward and from the axis of the structure and extended through the radial slots of the member so as to produce a non-rotative connection between the two members, extensions carried by the free ends of said arms and adapted to engage the radial-notch member to produce an axial movement of the pulley member, and a spring interposed between said two members.

2. A governor pulley comprising a friction member and a hub member said hub member having a pair of radially extending notches and adapted for connection with a shaft so as to rotate therewith, a pair of arms pivoted to the friction member so as to swing toward and from the axis thereof and extended through the radial notches of the hub member, extensions carried by said arms for engaging a face of the hub member to cause axial movement of the pulley member, and a spring interposed between the friction member and hub member.

3. A governor pulley structure comprising a main body having an axial hub, a friction member therefor comprising a pair of annular clamping plates, an interposed friction cup, and clamping screws passed therethrough, the ends of said clamping screws entering suitable sockets formed in the main body around the hub, and a clamping nut threaded upon the hub and holding the friction member in position.

In witness whereof, I have hereunto set my hand and seal at Pendleton, Indiana, this thirteenth day of October, A. D. one thousand nine hundred and nine.

HOMER N. MOTSINGER. [L. S.]

Witnesses:
W. W. CONNER,
R. F. THOMAS.